United States Patent Office 3,471,254
Patented Oct. 7, 1969

3,471,254
OXIDATION OF SOLUBLE SULFIDES
Peter Urban, Northbrook, Ill., assignor to Universal Oil Products Company, Des Plaines, Ill., a corporation of Delaware
No Drawing. Filed Jan. 3, 1967, Ser. No. 606,565
Int. Cl. C01b *17/06;* C01f *7/68, 11/48;* C01g *53/10*
U.S. Cl. 23—114                                    7 Claims

ABSTRACT OF THE DISCLOSURE

A phthalocyanine based catalyst for the oxidation of soluble sulfide compounds is prepared by reacting a soluble metallic phthalocyanine in an alkaline solution with a mercaptan and $O_2$. A curd-like material comprising a phthalocyanine catalytic complex of increased molecular weight is formed. Such catalytic complex has the unusual property of being soluble in sulfide solution and insoluble in sulfide-free solution. Accordingly, the complex may be used as a homogeneous catalyst for the oxidation of sulfide solutions without excessive catalyst loss in the oxidation zone effluent.

---

The present invention relates to a method of preparing a phthalocyanine catalytic complex which has unusual solubility characteristics facilitating its use in the oxidation of soluble sulfide compounds. More precisely, the present invention is directed at the resolution of a substantial catalyst recovery problem that has heretofore plagued processes, for the oxidation of soluble sulfide compounds, utilizing a soluble phthalocyanine catalyst. This recovery problem essentially involves the fact that it is desirable, for reasons of reaction rate and of efficient catalyst utilization, to employ a phthalocyanine catalyst that is soluble in the sulfide solution that is to be oxidized, coupled with the fact that the catalyst is too expensive to discard in the treated sulfide solution once its oxidation mission is accomplished. The concept of the present invention stems from my recognition that a phthalocyanine catalyst which is treated with a mercaptan, an alkaline reagent, and oxygen forms a complex which is soluble in an aqueous sulfide solution and insoluble in a substantially sulfide-free, aqueous solution. Accordingly, the present invention essentially involves the use of this remarkable phthalocyanine catalytic complex in the oxygen treatment of sulfide solutions.

As part of the price that has to be paid for a modern industrial society, large quantities of undesired solutions of sulfide compounds are currently available as waste streams from a number of industrial sources. In particular, aqueous solutions containing hydrogen sulfide are undesired side products of many economically significant industrial processes in the chemical, petroleum, and steel industries. For instance, in the petroleum industry, large quantities of solutions of sulfide compounds are produced by such processes as hydrorefining, hydrocracking, reforming, and the like. In fact, a common feature of all these processes is that they operate on a petroleum fraction, a shale oil, a coal tar oil, and the like, which invariably contains organic and inorganic sulfur compounds. During the course of these petroleum processes, these organic sulfur compounds are converted into hydrogen sulfide and hydrocarbons. The resultant hydrogen sulfide is then, typically, removed from these processes by absorption in a suitable scrubbing solution. In a large measure, these scrubbing solutions are aqueous, alkaline solutions, and their disposal presents quite a problem, because of their potential biological oxygen demand which is primarily a consequence of the presence of sulfide ion. In a case of particular interest to the present invention, hydrorefining of petroleum distillates, large quantities of ammonia and hydrogen sulfide are produced, and these are generally absorbed in an aqueous solution which is subsequently withdrawn from the process. In a similar vein, sweetening treatment of a natural gas with a suitable scrubbing fluid, such as monoethanolamine, also results in a solution containing sulfide ions. These solutions are typical of those that are referred to herein as "sulfide solutions," and that constitute the principal input stream to the process of the present invention.

The sulfide compound present in these solutions is generally present as a salt of a strong base such as ammonium sulfide, sodium sulfide, postassium sulfide, and the like, which may be ionized to various degrees. Moreover, the sulfide compound may be present in the same kind of a polar association which characterizes, for instance, solutions of hydrogen sulfide and diethanolamine. In this respect, it should be remembered that hydrogen sulfide because of its polar nature is soluble in an aqueous solution to some degree even in the absence of an appropriate solubility-increasing agent; for example, at 20° C. and 1 atmosphere pressure, 2.5 ml. of hydrogen sulfide will dissolve in one ml. of water. Thus, hydrogen sulfide is within the class of sulfide compounds that are present in these solutions.

Quite understandably, in recent years attention has been focused upon means of converting the sulfide compounds into forms that have less demand for oxygen and, if possible, into a form that has substantial economic value. It has been found, recently, that a particularly preferred process for accomplishing this conversion involves contacting a sulfide solution and oxygen with a phthalocyanine catalyst. Also, it has been found that this process can be utilized, if desired, to transform sulfide compounds into valuable elemental sulfur and, alternatively, into sulfur compounds of reduced oxygen demand suitable for discharge into rivers and streams, if sulfur production is not economically feasible. In addition, it has been determined that this phthalocyanine catalyst may be utilized in combination with a carrier material as a heterogeneous catalyst, or as a sulfide solution-soluble homogeneous catalyst.

From elementary catalysis, it is known to be generally true that the rate of a reaction catalyzed by a heterogeneous catalyst is generally a complex function of the rate of diffusion of the reactants to the surface of the catalyst, the rate of reaction at the surface (this in turn depends directly on the area of exposed catalyst), and the rate of diffusion of the products of the reaction from the catalytic surface. It is equally true that the rate of a reaction catalyzed by a homogeneous catalyst is usually directly proportional to the concentration of the catalyst. Thus, as a general rule, a homogeneous catalyst system is preferable to a heterogeneous catalyst system, because of the vastly increased available catalytic surface area which results in high reaction rates and more efficient utilization of the available catalyst. For this phthalocyanine catalyst, these general rules, indeed, have been found to apply; and the homogeneous system has been found to be, insofar as rate of reaction is concerned, vastly superior to the heterogeneous system. The heterogeneous system, furthermore, has been found to be unusually susceptible to deactivation by elemental sulfur deposition on the surface of the catalyst, while with the homogeneous system this has not been particularly a significant problem. In view of these advantages, it would be expected that the homogeneous system would be the preferred system; however, this has not been the case. The principal reason for this has been the lack of a suitable procedure to recover the homogeneous catalyst once the reaction has been completed, coupled with the prohibitive expense of continuously discarding the catalyst along with the treated sulfide solution. I have now found a procedure of catalyst treatment which allows the recovery of the phthalocyanine catalyst and enables the realization of the advantages of working with a homogeneous system. Basically, my procedure involves contacting a soluble phthalocyanine catalyst with a mercaptan, an alkaline reagent, and oxygen at conditions effecting formation of a phthalocyanine complex which, quite surprisingly, is soluble in the sulfide solution and insoluble in the resultant substantially sulfide-free, treated solution.

It is, accordingly, one object of my invention to provide an improvement in a process utiliizng a homogeneous phthalocyanine catalyst for the production of elemental sulfur from a sulfide solution. The second object is to provide an improvement in a process which utilizes a homogeneous phthalocyanine catalyst for the purpose of reducing the biological oxygen demand of a sulfide solution. A third object is to prepare a phthalocyanine catalyst which is soluble in a sulfide solution and insoluble in an aqueous, sulfide-free solution. Another object is to provide a homogeneous phthalocyanine catalyst which is easily recoverable from the effluent from a sulfide oxidation zone.

In a broad embodiment, the present invention relates to a method of preparing a sulfide compound oxidation catalyst which is water-soluble in the reduced state and water-insoluble in the oxidized state. The method comprises contacting a mercaptan and oxygen with an alkaline solution of a phthalocyanine compound at conditions effecting formation of a phthalocyanine catalytic complex having the desired properties.

Another broad embodiment encompasses an improvement in a process for the oxidation of a soluble sulfide compound, wherein an aqueous solution of the sulfide compound and oxygen are contacted in a reaction zone with a water-soluble phthalocyanine catalyst at conditions effecting oxidation of the sulfide compound, and wherein the phthalocyanine catalyst remains in the aqueous effluent from the reaction zone and is not easily recovered therefrom. The improvement in the process initially contacting the phthalocyanine catalyst with a mercaptan, an alkaline reagent, and oxygen at conditions effecting formation of a phthalocyanine complex which is soluble in the aqueous sulfide solution and which is insoluble in the substantially sulfide-free, aqueous effluent from the reaction zone, thereafter, during the operation of the improved process employing the resultant phthalocyanine complex, separating the effluent from the reaction zone into an aqueous phase and a phthalocyanine phase, and recycling the phthalocyanine phase to the reaction zone.

Still another embodiment of the present invention encompasses a process for the oxidation of a soluble sulfide compound which utilizes a sulfur solvent that is substantially immiscible with the sulfide solution. This process comprises contacting an aqueous solution of the sulfide compound, the water-immiscible sulfur solvent, and oxygen with the phthalocyanine catalytic complex prepared in accordance with the method delineated in the previous embodiments, in a reaction zone at conditions effecting oxidation of the sulfide compound, separating the effluent from the reaction zone into an aqueous phase, a sulfur solvent phase, and a phthalocyanine phase, and recycling the phthalocyanine phase to the reaction zone.

Other embodiments and objects of the present invention encompass particular catalyst treatment conditions and reagents, sulfide solutions, phthalocyanine compounds, process conditions, sulfur solvents, and process configurations, which are hereinafter disclosed in the discussion of each of these facets of the present invention.

At this point it is to be recognized that the terms "water-soluble" and "water-insoluble" as used herein and in the appended claims are to be interpreted to connote solubility or insolubility (as the case may be) in other polar solvents, that have similar solubilizing characteristics to water, and that may be utilized in place of water. Also the term "reduced state" when it is applied to a phthalocyanine catalyst refers to the condition of the catalyst when it has been exposed to an oxidizing agent. And, the term "oxidized state" refers to the condition of the phthalocyanine catalyst after it has been exposed to an oxidizing agent such as oxygen.

From the previous discussion, it is apparent that a principal feature of the present invention is the formation of a phthalocyanine catalytic complex with a remarkable solubility characteristics. Not too much is known about the exact nature of this complex, although it is known that once the complex is formed it tends to be stable. In addition, it is known that an alkaline solution of mercaptan and phthalocyanine compound in the absence of an oxidizing agent will not form this complex; nor will an alkaline solution of disulfide and a phthalocyanine compound form it. Consequently, it is hypothesized that it is a complex between the phthalocyanine compound and some intermediate compound formed during the oxidation of mercaptan to disulfide, although applicant does not wish to be restricted to this interpretation. Despite this enigma of its exact structure, it is clear that it does exist and that it does have the desired solubility properties; and these are the things of interest to the present invention.

In order to form this complex it is necessary to treat a phthalocyanine compound with a mercaptan, an alkaline reagent, and oxygen at the proper conditions. First, as to the phthalocyanine compound, it is evident from my investigations that any suitable water-soluble phthalocyanine compound may be used in the present invention and preferably comprises a metal phthalocyanine. Particularly preferred metal phthalocyanines include cobalt phthalocyanine and vanadium phthalocyanine. Other metal phthalocyanines include iron phthalocyanine, copper phthalocyanine, etc. The metal phthalocyanines, in general, are not readily soluble in aqueous solvents and for ease in effecting the desired homogeneous catalyst system, a polar derivative of the phthalocyanine is preferred. A particularly preferred derivative is the sulfonated derivative. Thus, an especially preferred phthalocyanine is cobalt phthalocyanine sulfonate. This may be a monosulfonate, a disulfonate, a trisulfonate, a tetrasulfonate, or mixtures of any of these. In fact, my investigation has shown that the tri- and tetra-sulfonated phthalocyanine compounds are preferred not only from the standpoint of their solubility characteristics, but also because they have a superior capability to effect the desired oxidation reaction. Another preferred catalyst comprises vanadium phthalocyanine sulfonate and polysulfonate as before. Thus, particularly preferred catalyst are cobalt phthalocyanine tetrasulfonate and vanadium phthalocyanine tetrasulfonate. These compounds may be obtained from any suitable source or may be prepared in any suitable manner as, for example, by reacting cobalt or vanadium phthalocyanine with 25 to 50% fuming sulfuric acid. While the sulfonic acid derivatives are preferred, it is understood that other suitable polar derivatives may be employed. Other derivatives include particularly the carboxylated derivative which may be prepared, for example, by the action of trichloroacidic acid on the metal phthalocyanine or by the action of phosgene and aluminum chloride. In the latter reaction, the acid chloride is formed and may be converted to the desired carboxylated derivative by conventional hydrolysis. It is understood that these different catalysts are not necessarily completely equivalent.

Second, as to the mercaptan necessary for the treatment procedure it is clear from my investigation that any aliphatic or aromatic hydrocarbon having the characteristic-SH group will suffice. Typical representatives of the aliphatic mercaptans are: methyl mercaptan, ethyl mercaptan, propyl mercaptan, butyl mercaptan, ethylene mercaptan, etc. Representative of the aromatic mercaptans is thiophenol, thiocresol, thioxylenol, etc. In addition, mixtures of mercaptan can be employed in the treatment procedure; in fact, a convenient source of mercaptans is a sour hydrocarbon distillate, containing a complex mixture of mercaptans, which can be utilized as such to effect the desired catalyst treatment.

Third, as to the alkaline reagent, it has been determined that the complex formation reaction generally requires an alkaline environment in order to promote contact between the phthalocyanine compound and the mercaptan. Any suitable alkaline or basic reagent may be employed such as sodium hydroxide, sodium phosphate, potassium hydroxide, lithium hydroxide, ammonium hydroxide, calcium hydroxide, barium hydroxide, etc. Preferred alkaline solutions are aqueous solutions of from about 1% to about 50% by weight concentration of sodium hydroxide or potassium hydroxide while aqueous solutions are preferred, it is understood that other suitable solvents may be used including alcohols, ketones ethers, etc.

Fourth, as to the stoichiometry of the treatment procedure, I have found that the only significant restriction is that enough mercaptan should be utilized such that at least one mole of mercaptan is processed for every mole of phthalocyanine compound. Additionally, oxygen—which may be present by itself or in admixture with other gases—is preferably utilized in the stoichiometric amount necessary to oxidize the mercaptan present to disulfide, although lower or higher amounts may be utilized in some cases.

Fifth, as to the method effecting the catalyst treatment, I have found that a convenient procedure is a batch operation in which an aqueous, alkaline solution of the phthalocyanine compound and the required quantity of mercaptan are contacted with a stream of oxygen. The reaction proceeds quite rapidly and the formation of the desired complex can be readily observed by reason of the formation of a new phase, or "curd," in the reaction zone. This catalyst-containing phase may then be injected into the sulfide solution reaction zone or admixed with the initial portion of the sulfide solution to be charged to this zone, as will be explained hereinafter. In addition, this complex formation reaction can be conveniently effected during the intial portion of the sulfide solution oxidation process by simply injecting the requisite amount of mercaptan into the reaction zone with the initial portion of the sulfide solution and the phthalocyanine catalyst. Moreover, in some cases it may be desirable to continuously inject mercaptan into the sulfide solution reaction zone in order to insure that the phthalocyanine complex does not disassociate under conditions maintained in the reaction zone.

Finally, the treatment procedure is generally effected at conditions that result in at least a portion of the mercaptan being oxdized to disulfide. Thus, any suitable temperature, which may range from about 0° C. to about 200° C. or more, preferably being within the range of from about 30° C. to about 125° C., may be utilized. Superatmospheric pressure can be used but ordinary atmospheric pressure will be sufficient. Similarly, the contact time necessary for the formation of the desired complex is ordinarily of the order of minutes; in fact, my experience has shown that a phase separation begins almost simultaneously with the injection of oxygen into the treatment zone, and the complex formation reaction is essentially complete once the requisite quantity of oxygen has been injected. On the other hand, prolonged treatment contact times are not detrimental and may be useful in some cases.

As pointed out hereinbefore, the present invention involves not only a treatment procedure for a phthalocyanine catalyst, but also the utilization of this treated catalyst in a sulfide solution oxidation process. Preferably, this process comprises contacting a sulfide solution and oxygen with the phthalocyanine catalytic complex prepared by the methods previously delineated, in a reaction zone at conditions effecting the oxidation of the sulfide compound. The effluent from the reaction zone then flows to a separating zone wherein the catalyst separates from the treated solution. The catalyst phase is then recycled to the reaction zone. In cases where the production of elemental sulfur is the chief objective of the process, it is preferred that an immiscible sulfur solvent be employed in admixture with the sulfide solution in order to facilitate the recovery of elemental sulfur, and the separation of the catalyst.

As indicated, the solution to be charged to the process of the present invention contains a sulfide compound. This sulfide solution may be derived from any industrial operation such as those commonly available from chemical plants, sewage treatment plants, etc. The solvent utilized in forming this solution may be aqueous, alcoholic, or any other suitable polar solvent. The solution is typically an aqueous solution and as such is commonly referred to as "waste water." In some cases, it is desired to convert the sulfide compounds contained in these solutions to the corresponding sulfite, thiosulfate, sulfate, dithionate, etc., which are in a highly oxidized state and, thus, have little demand for oxygen. On the other hand, it may be desired to convert the sulfite compounds to elemental sulfur. In either case, the process to the present invention can effect the desired transformation. The sulfite compounds, furthermore, are generally present in small concentrations, less than 5% by weight of the solution, although the present invention works equally well with solutions having a higher concentration of sulfide compounds. In addition, the sulfide solution typically contains one or more alkaline components which enhance the solubility of the sulfide in the solution; examples of these are: ammonia; metal salts of weak acids such as alkaline metal carbonates, phosphates, etc.; organic bases such as methyl amine, ethyl amine, ethanolamine, propanolamine, etc.; and others well known in the art. As previously noted a particularly important class of solutions for the present invention are ammoniacal, aqueous solutions of hydrogen sulfide.

Another essential reactant for the process of the present invention is oxygen. This may be present in any suitable form, either by itself or mixed with other gases. In an embodiment of the present invention in which it is desired to produce elemental sulfur as the principal product, oxygen is utilized in approximately the stoichiometric amount necessary to effect this transformation—preferably, about 0.50 to about 1.5 moles of oxygen for each mole of sulfide. Alternatively, if it is desired to minimize the oxygen demand of this solution in order to allow its discharge into streams and rivers, then oxygen is present in an amount in excess of the stoichiometric amount necessary to convert sulfide to sulfate—preferably, in an amount greater than approximately 2.0 moles of oxygen per mole of sulfide.

As previously indicated, the preferred operation of the present invention encompasses the utilization of a sulfur solvent to facilitate separation of the phthalocyanine phase from the treated aqueous phase in the separating zone of the present invention. Any suitable sulfur solvent may be utilized provided it is substantially inert to the conditions utilized for sulfide oxidation reaction and that it dissolves substantial quantities of sulfur. Examples of typical sulfur solvents are: disulfides such as carbon disulfide, methyl disulfide, ethyl disulfide, methyl ethyl disulfide, etc.; aromatic compounds such as benzene, toluene, xylene, ethylbenzene, naphthalene, 2-methyl naphthalene, etc.; aliphatic paraffins such as pentanes, hexanes, heptanes, octanes, nonanes, decanes, etc.; cyclic paraffins such as methylcyclopentane, cyclopentane, cyclohexane, etc.; halogenated compounds such as butyl chloride, propyl bromide, ethylene dibromide, chlorobenzene, dichlorobenzene, etc.; and the like sulfur solvents. Moreover, mixtures of these solvents may be used if desired.

In general, the preferred operation of the present invention encompasses the utilization of a sulfur solvent that is substantially immiscible with the sulfide solution that is to be oxidized. Further, the solubility of sulfur in the solvent is preferably such that the sulfur solubility is markedly greater at a temperature in the range of about 80° C. to about 200° C. than it is at a temperature in the range of about 0° C. to about 75° C. This last preference facilitates removal of the sulfur through crystallization, if such is desired. Considering all of these requirements, I have found that, when the sulfide solution is aqueous, the preferred sulfur solvent is selected from the group consisting of benzene, toluene, xylene, and mixtures thereof.

The process of the present invention can be effected in any suitable manner—either as a batch or as a continuous operation. A particularly preferred system involves a continuous operation in which a sulfide solution in admixture with a sulfur solvent is passed to a reaction zone in either upward, downward, or radial flow. A slurry of the phthalocyanine catalytic complex, prepared by the treatment procedure previously outlined, is then either injected directly into the reaction zone or is commingled with the sulfide solution prior to its introduction into the reaction zone. In any event, at least a portion of the catalytic slurry dissolves in the sulfide solution either prior to its entrance to the reaction zone or while in the reaction zone. A stream of oxygen is then passed into the reaction zone in either concurrent or countercurrent flow to the sulfide solution. In some cases, it may be advantageous to effect the oxidation reaction in a multi-stage manner; however, this discussion will be confined to a single stage process.

In any event, the effluent from the reaction zone is passed to a separating zone. Here, in the preferred operation in which an immiscible sulfur solvent is utilized, a sulfur solvent phase separates from a treated sulfide solution phase and a rag layer (or "curd") forms between these two phases. This rag layer is rich in the phthalocyanine catalytic complex because, as previously explained, the oxidized form of this complex is insoluble in the substantially sulfide-free solution. At least a portion of the sulfur solvent phase is then withdrawn from the separating zone and is passed to a sulfur recovery zone in which at least a portion of its dissolved sulfur is removed by methods well known in the art. A preferred procedure is to cool the sulfur solvent to the point where crystallization begins, and the precipitated sulfur is then drawn off from the bottom of the sulfur recovery zone in a slurry. This slurry can then be treated to recover the solid sulfur by any of the methods known in the art of removing solid particles from a liquid such as filtration, centrifugation, settling, etc. The lean sulfur solvent can then be recycled to the reaction zone for further use therein.

The rag layer from the separating zone is then withdrawn, and recycled to the reaction zone in order to supply the catalyst necessary for the reaction therein. In a similar manner the treated sulfide solution phase is withdrawn from the bottom of the separating zone. It may, if desired, be further utilized in a number of ways. For instance, since it is greatly reduced in sulfide content, it may be recycled to the industrial process from which it came for further use therein. On the other hand, this treated effluent may, depending on the operating conditions employed in the present invention, be sufficiently reduced in biological oxygen demand that it can be safely discharged into streams and rivers.

It is to be noted that in some cases it may be desirable to withdraw the rag layer in conjunction with the withdrawal of the sulfur solvent. The phthalocyanine catalytic complex would then be carried back to the reaction zone in the sulfur solvent recycle stream. Likewise, it is to be recognized that, in order to insure complete recovery of the rag layer, it may be advantageous to recycle the upper portion of the treated sulfide solution phase from the separating zone.

This sulfide oxidation reaction is effected at any suitable temperature which may range from about 0° C. up to about 200° C. or more. When the process of the present invention is operated so that elemental sulfur is produced with high selectivity, it is preferred to operate in the range of about 0° C. to about 125° C. And when the process is operated, to produce sulfate with high selectivity, it is preferred to operate in a range of about 100° C. to about 200° C. The pressure employed can be any pressure which maintains the sulfide solution and sulfur solvent in the liquid phase. In general, it is preferred to operate at superatmospheric pressures and a pressure of about 25 p.s.i.g. to about 75 p.s.i.g. is particularly suitable. Likewise, any suitable contact time of the reactants and the catalyst can be utilized which may range from about 5 minutes up to about four hours. However, it is generally preferred to operate at a contact time of about 0.5 hours to about 2.0 hours.

The following examples are given to illustrate further the novelty, mode of operation, and utility of the present invention. It is not intended to limit unduly the present invention to the flow scheme, process conditions, and types of catalysts employed therein, since these are intended to be illustrative rather than restrictive.

Example I

A solution of cobalt phthalocyanine tetrasulfonate is prepared by dissolving 1.0 grams of this compound in 500 cc. of an aqueous, caustic solution containing 10% by weight sodium hydroxide. Tertiary-butyl mercaptan is then added to this solution in an amount sufficient to result in 5 moles of mercaptan per mole of the phthalocyanine compound. At this point, the color of the solution is yellowish green. Air is then injected into the solution until it changes its color to a faint light blue: that is sufficient air to supply about 0.25 moles of oxygen for every mole of mercatan in the solution. During this period the solution is maintained at 25° C. The solution is then examined and it is found that a "curd" has formed on the surface of the aqueous solution. This "curd" is then decanted off, washed with heptane, and analyzed. Results of the analysis indicated that at least 90% of the original amount of phthalocyanine compound is present in this "curd" and, furthermore, that the phthalocyanine compound that is present has increased in molecular weight. This latter result indicates complex formation.

Example II

A procedure similar to that reported in Example I is carried out with a vanadium phthalocyanine tetrasulfonate compound and ethyl mercaptan. Once again, the "curd" formation is observed and complex formation is indicated.

Example III

A cobalt phthalocyanine complex, prepared by the method delineated in Example I, is added to 500 cc. of an aqueous, ammoniacal solution of hydrogen sulfide containing 2.35% sulfide by weight (calculated as sulfur) and 1.67% by weight ammonia. The complex dissolves completely in the solution, and the color of the solution becomes yellowish green. This operation is performed in a three-neck liter flask equipped with a high speed stirrer. With the stirrer activated, air is then injected into the system at a rate corresponding 0.5 moles of oxygen per gram atom of sulfur in the solution per hour. During the reaction period the flask is maintained at a temperature of about 30° C. and at about atmospheric pressure. After about an hour, it is noted that the color of the solution has changed to a faint blue, and a "curd" has formed on the surface of the solution. Analysis of this "curd" shows that it contains about 98% of the catalyst originally added to the solution. In addition, it is found to contain, as elemental sulfur, 75% of the sulfur originally present in the solution as sulfide.

Example IV

A vanadium phthalocyanine catalytic complex prepared according to the method delineated in Example II is subjected to an experiment identical to that reported in Example III. Once again at the termination of the reaction a "curd" is formed that contains about 95% of the catalytic complex, but in contrast to the results of Example III it contains, as elemental sulfur, less than 6% of the sulfur originally present in the solution as sulfide. An analysis of the aqueous solution remaining after the "curd" removal shows that the remaining 93% of the sulfide, originally present in the solution, is now present as water soluble oxidation products such as sulfite, thiosulfate, dithionate, etc. salts. These results then indicate that the vanadium complex is very selective for the water soluble products of sulfide oxidation, whereas the cobalt complex is selective for elemental sulfur production.

Example V

An aqueous waste stream is continuously produced by a hydrorefining process. It contains 2.35% by weight sulfide (calculated as sulfur) and 1.67% by weight ammonia. This waste stream is admixed with a toluene stream and with a stream containing a cobalt phthalocyanine complex prepared by the method outlined in Example I; the point of origin of these latter two streams will appear hereinafter. The toluene stream is supplied at a volumetric rate equal to that of the waste stream, and the resultant stream is charged to a reaction zone at a rate calculated to result in a residence time, at the reaction zone, of the stream of about 0.5 hour. The cobalt phthalocyaine complex is supplied at a rate sufficient to result in a solution having 400 p.p.m. of the catalytic complex based on the weight of the waste solution. In addition, air in an amount sufficient to supply 1.2 moles of oxygen per gram atom of sulfur in the waste stream is injected into the reaction zone. The resultant mixture of air, waste stream, and toluene pass in concurrent flow through the reaction zone.

The reaction zone contains a stirring paddle which facilitates contact between the reactants and the catalyst. Moreover, it is maintained at a temperature of 40° C. and at a pressure of 50 p.s.i.g.

The effluent from the reaction zone is passed through heating means to a separating zone which is maintained at 90° C. Here a three phase separation takes place. The upper phase is a toluene phase, the lower phase is a treated aqueous phase, and the interfacial phase (or "rag" layer) is rich in the oxidized form of the cobalt phthalocyanine catalytic complex. After a residence time in the separating zone sufficient to bing about the desired phase separation, the interfacial phase is withdrawn and recycled to the reaction zone in order to supply catalyst thereto, as previously indicated. The toluene phase is withdrawn and passed to a sulfur recovery zone in which a portion of its dissolved sulfur is removed by a conventional crystallization procedure.

In this case, the toluene is passed through cooling means in order to lower its temperature about 30° C. and then into a recovery zone which has been seeded with sulfur crystals. A lean toluene effluent stream is then withdrawn from the upper regions of this zone and recycled to the reaction zone for further use therein, as previously indicated. A slurry of elemental sulfur is drawn off from the bottom of the sulfur recovery zone and passed through a conventional filter in order to recover elemental sulfur.

The aqueous phase that is withdrawn from the lower portion of the separating zone is found to have a total sulfur content of less than 10% of its original value, and to be suitable for reuse within the hydrorefining process or for discharge in neighboring streams or rivers. In addition, a sulfur balance on the process shows that of the sulfur entering the process as sulfide, approximately 85% of it is recovered as elemental sulfur. Moreover, the concentration of the catalyst, after a prolonged period of operation, is found to be greater than 90% of its initial value is in sharp contrast to the results obtained when the process is operated without the catalyst treatment of the present invention. In this latter case, the catalyst would have been carried out of the system in the aqueous phase effluent from the separating zone at a rate which would necessitate its constant replenishment.

I claim as my invention:

1. In a process for the oxidation of a soluble sulfide compound wherein an aqueous solution of said sulfide compound and oxygen are contacted in a reaction zone with a water-soluble phthalocyanine catalyst at conditions effecting oxidation of said sulfide compound, and wherein said phthalocyanine catalyst remains in the aqueous effluent from said reaction zone and is not easily recovered therefrom, the improvement which comprises initially reacting a metallic phthalocyanine with at least one mol proportion of a mercaptan per mol proportion of said phthalocyanine, an alkaline reagant, and oxygen at a temperature of from about 0° to about 200° C. to form a curd comprising a phthalocyanine catalytic complex which is characterized by being soluble in the aqueous sulfide solution and insoluble in the substantially sulfide-free, aqueous effluent from said reaction zone; thereafter, during the operation of the improved process employing as the catalyst in said reaction zone said curd comprising said phthalocyanine catalytic complex by separating the effluent from said reaction zone into an aqueous phase and a phthalocyanine phase, and recycling said phthalocyanine phase to said recation zone.

2. The improved process of claim 1 further characterized in that said phthalocyanine catalyst is cobalt phthalocyanine tetrasulfonate.

3. The improved process of claim 1 further characterized in that said phthalocyanine is a vanadium phthalocyanine tetrasulfonate.

4. The process of claim 1 further characterized in that a water immiscible sulfur solvent is introduced to said reaction zone and the effluent therefrom is separated into an aqueous phase, a solvent phase, and a phthalocyanine phase.

5. The method of claim 4 further characterized in that said phthalocyanine compound is a sulfonated metallic phthalocyanine.

6. The proces of claim 4 further characterized in that said sulfur solvent is an aromatic hydrocarbon.

7. The process of claim 6 further characterized in that said aromatic hydrocarbon is toluene.

References Cited

UNITED STATES PATENTS

| | | | |
|---|---|---|---|
| 3,034,865 | 5/1962 | Urban | 23—225 |
| 3,039,855 | 6/1962 | Urban | 23—225 |
| 3,095,276 | 6/1963 | Urban | 23—225 |
| 3,108,081 | 10/1963 | Glein | 252—428 |

OSCAR R. VERTIZ, Primary Examiner.

G. O. PETERS, Assistant Examiner.

U.S. Cl. X.R.

23—115, 116, 117, 129, 225; 252—428, 431